May 31, 1938.    J. N. STOUT    2,119,087
MECHANISM FOR ACTUATING GRAIN DROPPING DEVICES
Filed Nov. 11, 1936
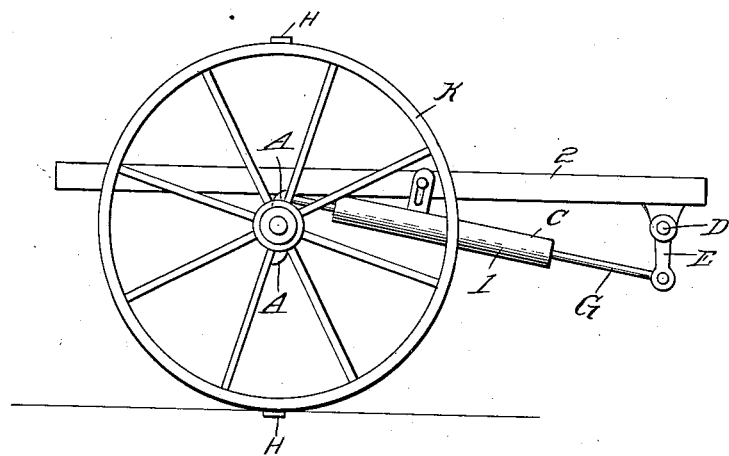
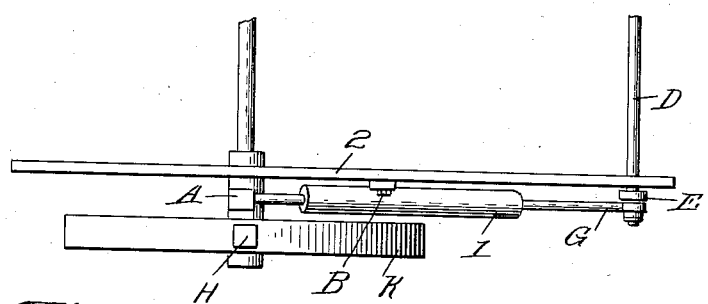
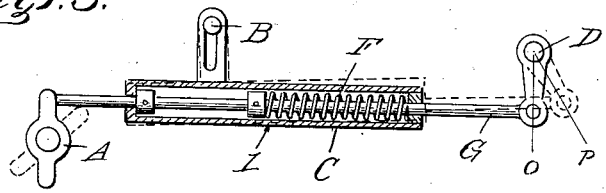
John N. Stout. INVENTOR
BY Victor J. Evans & Co.
ATTORNEY Patented May 31, 1938

2,119,087

UNITED STATES PATENT OFFICE 2,119,087

MECHANISM FOR ACTUATING GRAIN DROPPING DEVICES

John N. Stout, Staunton, Ind., assignor of one-third to David Stigler and one-third to Bert M. Laymon, both of Clay County, Ind.

Application November 11, 1936, Serial No. 110,370

3 Claims. (Cl. 275—9)

This invention relates to a grain dropping attachment adaptable to any standard type of seed planter and has for the primary object the provision of a device of this character which may be readily adapted to a planter to completely replace the present type of dropping attachment now in use and embodies a mechanism to operate the planter dropping rod and also marking devices on the drive wheel for recording the exact spot where the grain is planted or lies, the marking being essential when it is desired to accurately lay out a field of grain.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary side elevation illustrating a grain dropping attachment constructed in accordance with the present invention and showing the application thereof to a fragmentary portion of a standard type planter.

Figure 2 is a fragmentary top plan view illustrating the same.

Figure 3 is a vertical sectional view showing the attachment.

Referring in detail to the drawing, the numeral 1 indicates the mechanism which operates a tripping rod D of a conventional type of planter. The mechanism 1 consists of an operating lever G slidably mounted in a housing C in which may be located a lubricant. The housing C contains a spring F for returning the operating lever to a non-operating position and at the same time closes the opening through which the grain drops from the planter. The housing is supported from the frame 2 of the planter by a pivot B secured to said frame and operable in the slot formed in a pivot arm secured on said housing. The operating lever G is pivotally connected to an arm E secured to the tripping rod D for imparting rotary motion thereto. The arm E moves through a small angle or from position O to position P when the operating lever G is forced forward by a cam A fastened rigidly to the wheel K of the planter. The number of cam faces on the cam is determined from the distance between adjacent hills. It is important that the 360 degrees be divided into equal segments by the cam faces. Otherwise the distance between the hills will not be equal for a complete revolution of the drive wheel K.

The drive wheel K is provided with protruding markers H which are so placed that they fall exactly upon the point or place where the grain is planted and make a slight indentation in the ground. This indentation is later used to accurately locate successive rows.

The operation of the device is as follows: When the planter is moved forward in the conventional manner, the drive wheel K rotates and the cam mechanism A moves in a position where one of the cam faces engages the operating lever G, causing it to move forward. This forward motion causes arm E to move from position O to position P imparting rotary motion to the trip rod D. The rotary motion causes the small doors of the planter to open, releasing the grain. This latter operation is normally found on all standard planters and is not altered in any manner by the present invention. With the continued rotation of the drive wheel K the marker H falls exactly upon the earth where the grain fell due to the tripping action explained above.

The location of the markers H as well as the circumference of the drive wheel K is entirely dependent upon the spacing of the hills of grain that is desired. For example, the desired spacing for a certain section in the country is three feet and six inches. From this it can be seen that the drive wheel K having a circumference of seven feet can be used. Then for each complete revolution of the wheel K there will be two marks and the operating lever G will operate twice. Knowing the circumference, the diameter is readily calculated and the proper wheel may be then designed.

While this invention relates only to the operating mechanism and the markers located on the drive wheel it is to be pointed out that more successful operation may be obtained if the present hill markers are replaced by combined hill and row markers which extend laterally of the drive wheel a distance coinciding with a desired distance between rows of hills. The marker of the present invention is intended to be used in connection with the dropping mechanism and the planter on each successive journey and will follow the mark with one of the drive wheels rather than straddle it as is customary with some planters. This method will provide a more uniform lateral spacing between rows of hills, and since the markers provide accurate spacing longitudinally, the field will be laid out with accuracy.

Should the planter be backed or moved in a direction reverse of the normal operating direction, the cam A, moving in a like direction, will engage the underface of the operating lever G and elevate the housing C, the pivot arm, through the medium of the slot formed therein, moving upwardly in relation to the pivot B, thereby preventing jamming of the parts and operation of the arm E.

Having described the invention, I claim:

1. In a grain planter, a frame having a drive wheel and a trip rod, a cam secured to said wheel, a housing pivoted to said frame, a lever slidable in said housing and adapted to be engaged by said cam to impart movement to said rod in one direction, and a spring in said housing engaging said lever to impart movement through said lever to said rod in another direction.

2. In a grain planter, a frame having a drive wheel and a trip rod, a lever secured to said trip rod, a cam secured to said wheel, a housing pivoted to said frame, a lever slidable in said housing and connected to said first mentioned lever and adapted for engagement by said cam whereby to rock said first mentioned lever in one direction, and a spring coacting with said housing and said second mentioned lever whereby to rock said first mentioned lever in another direction.

3. In a grain planter, a frame having a drive wheel and a trip rod, a lever secured to said trip rod, a cam secured to said wheel, a housing pivoted to said frame, a lever slidable in said housing and connected to said first mentioned lever and adapted for engagement by said cam whereby to rock said first mentioned lever in one direction, a spring coacting with said housing and said second mentioned lever whereby to rock said first mentioned lever in another direction, and means embracing the connection of said housing with said frame for preventing rocking of said first mentioned lever upon rotation of said drive wheel in a direction other than the normal operating direction of said wheel.

JOHN N. STOUT.